May 26, 1931.   R. PRICE   1,806,951
MACHINE TOOL FOR METAL WORKING PURPOSES
Filed Sept. 20, 1926   3 Sheets-Sheet 1

INVENTOR
Robert Price
by Henry Blech
Att'y

May 26, 1931.                R. PRICE                 1,806,951
            MACHINE TOOL FOR METAL WORKING PURPOSES
                    Filed Sept. 20, 1926      3 Sheets-Sheet 3
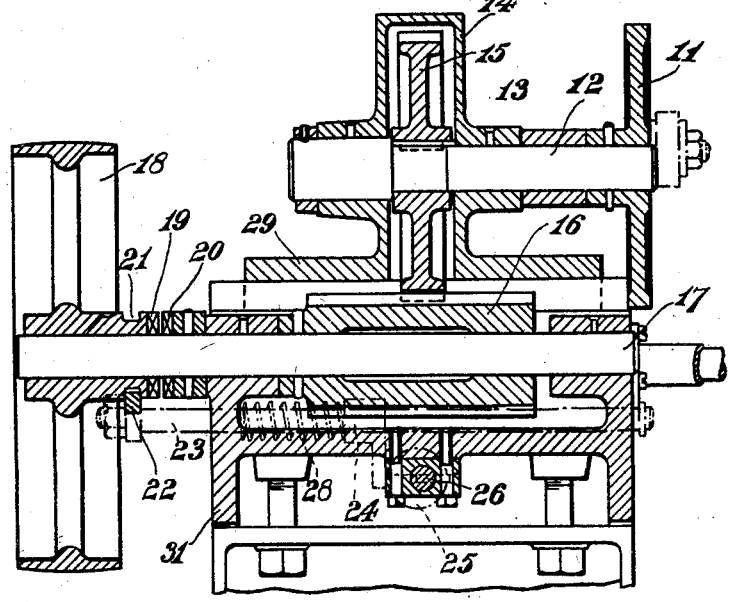
Fig.3.
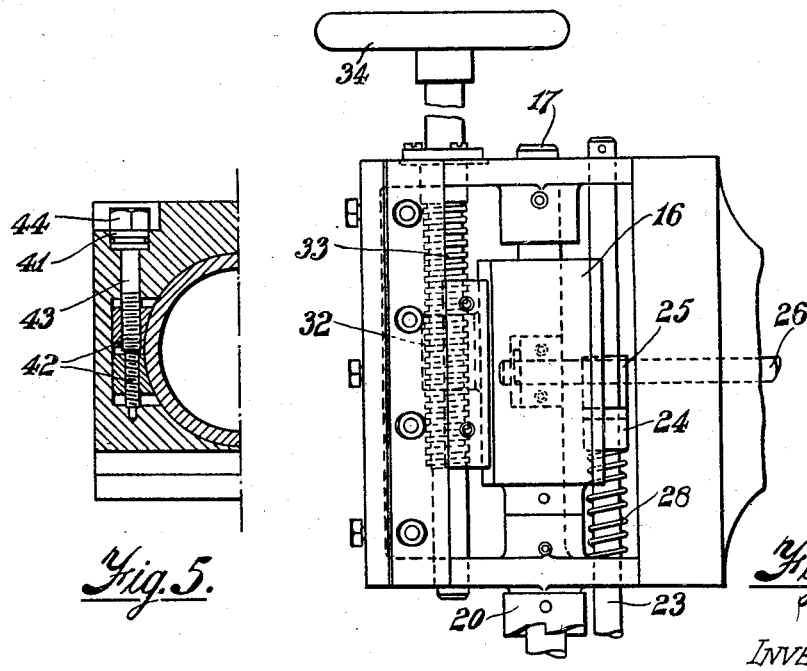
Fig.5.                                              Fig.4.
INVENTOR
Robert Price
by Henry Blech
Atty.

Patented May 26, 1931

1,806,951

UNITED STATES PATENT OFFICE

ROBERT PRICE, OF PUTNEY, LONDON, ENGLAND

MACHINE TOOL FOR METAL WORKING PURPOSES

Application filed September 20, 1926, Serial No. 136,435, and in Great Britain September 21, 1925.

This invention relates to machine tools for metal working purposes and has for its object to provide an improved machine applicable for hack sawing, keyway cutting and allied purposes in which the position, direction and depth of cut can be prearranged and the machine left to complete the operation with practically no attention, the article to be cut or otherwise worked being so mounted that cuts of varying depth and at varying angles the one to the other can be made by simple adjustments in the work holding means and in the operating mechanism for the saw or other tool.

Whereas in known machine tools of the kind to which the invention relates lateral adjustment of the cut in directions at right angles to the plane of reciprocation of the tool is effected by movement of the work tool across the machine, according to the present invention a machine is provided in which a reciprocable saw or tool holder adapted to operate horizontally or at any desired position of angularity is capable of being traversed with its operating mechanism across the machine for the purpose of bringing the saw or other tool into vertical alignment with the position in the work at which a cut is required. In the preferred form of construction, the machine comprises in combination with a reciprocable tool holder mounted for adjustment in the manner described above, a work holder or table which is rotatably and longitudinally adjustable on an axis parallel to the plane of reciprocation of the tool, thus enabling cuts to be made at various angles in various parts of the work. Adjustment of the direction of the cut in relation to the longitudinal axis of the work may be obtained by adjustment of the work about the vertical axis.

Reference will now be made to the accompanying drawings which illustrate by way of example a sawing machine constructed according to the invention and in which:—

Figure 3 is a detail view comprising a cross section on the line A—A of Figure 2 looking in the direction of the arrows, Figure 4 is a partial plan of the arrangement shown in Figure 3 with the housing and top slide removed, and Figure 5 is a cross section on the line B—B of Figure 1.

Figure 1:
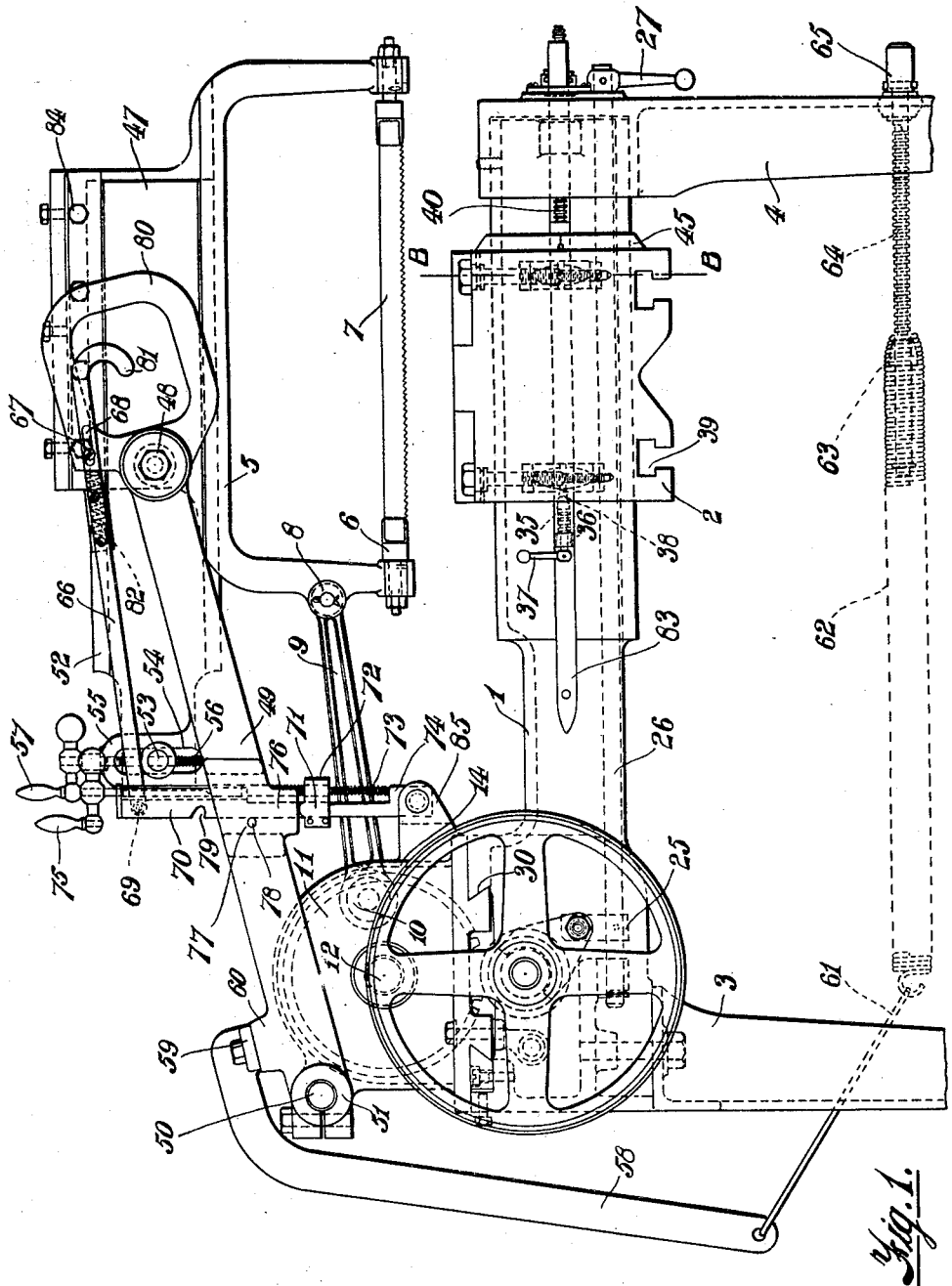
Figure 1 is an elevation.
Figure 2:
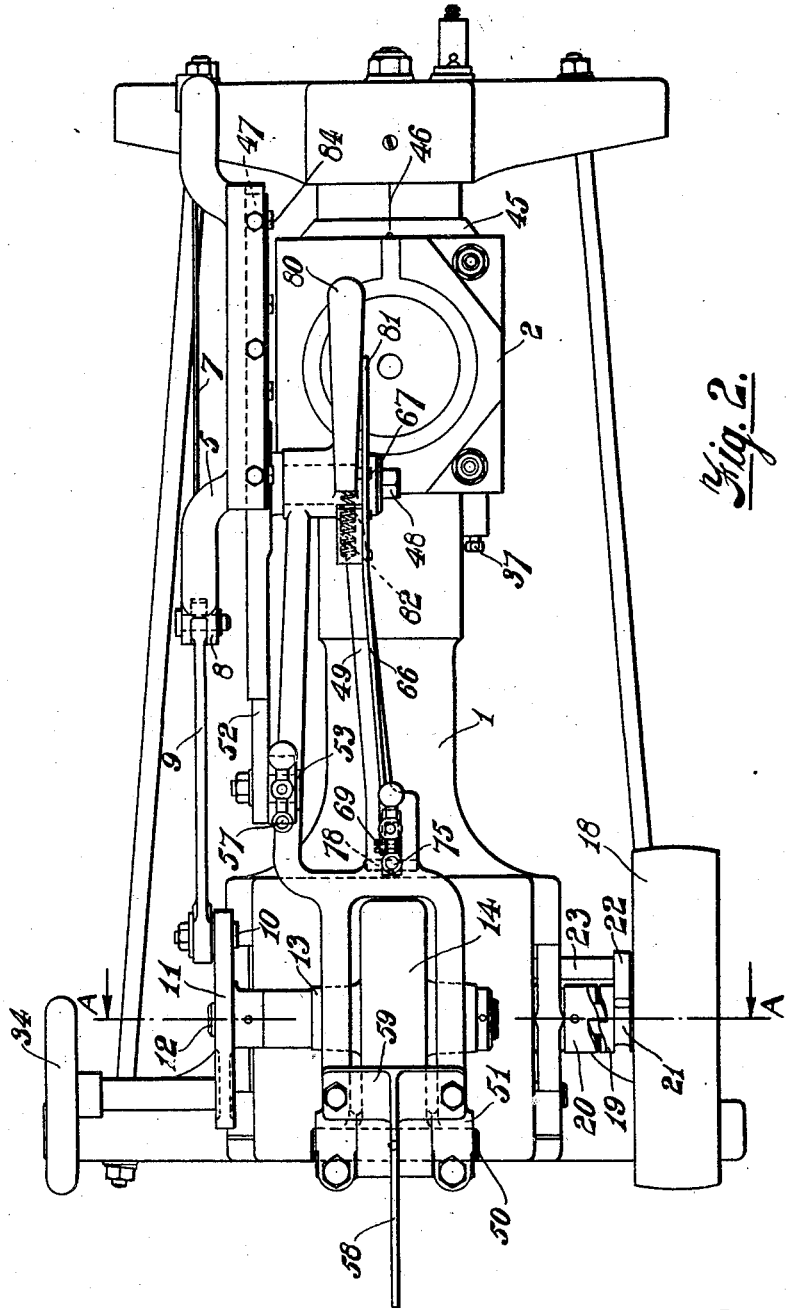
Figure 2 is a plan.

In the drawings 1 indicates a fixed base plate having mounted upon it a movable multiple sided bedplate 2, said base plate being mounted on supports 3 and 4. Disposed above the movable bedplate is a sawframe 5 carrying at its lower extremities clamps 6 to enable a saw-blade 7 to be mounted therein. At one end the frame 5 is pivotally connected at 8 to a connecting rod 9 the other end of which is pivoted to a crank pin 10 carried by a disc 11 and which may be adjustable radially in said disc for a purpose hereinafter described. The disc 11 is mounted on a shaft 12 supported in bearings 13 forming part of a housing 14 for a spur wheel 15 also fixed to the shaft 12, said spur wheel meshing with an elongated driving pinion 16 mounted on a shaft 17 disposed vertically beneath the shaft 12. Upon the outer end of the shaft 17 is loosely mounted a belt pulley 18 which carries one part of a dog clutch 19, the other portion 20 of the clutch being fast on the shaft 17, whereby movement of the pulley 18 and dog clutch member 19 towards the right (Figure 3) effects a positive drive from a source of power to the shaft 17. A groove 21 on the boss of the pulley 18 accommodates the arms of a forked lever 22 secured to a shaft 23 having thereon an arm 24 urged by a spring 28 into engagement with a cam 25 fixed to a shaft 26 extending across the machine to the support 4 where it is provided with an operating handle 27.

The housing 14 with the gear wheel 15, shaft 12 and disc 11 are carried in a slide 29 movably mounted in dove-tail grooves 30 formed in the upper surface of a housing 31 in which the shaft 17 and its adjacent parts are carried, the said slide being formed or provided with a downwardly extending nut 32 through which passes a screw threaded spindle 33 carried in the housing 31 and having at its outer end a hand wheel 34 for manual operation to adjust the position of the slide 29 relatively to the housing 31 as hereinafter described, a considerable latitude of adjustment being allowed governed by the length of the longfaced pinion 16.

The multiple sided bed-plate 2 is adapted to be locked in any one of a number of predetermined positions upon the base 1 by means of a rotatable screw threaded spindle 35 mounted in a housing 36 on the base 1 and having a handle 37 for manual operation, rotation of this spindle in one direction causing its end 38 to engage in one of a series of recesses formed in the end of the bed-plate 2 whilst rotation in the opposite direction frees the bed-plate for angular adjustment. The bed-plate 2 is provided with grooves 39 for attachment thereto of a vise or like work-retaining device. The bed-plate is adapted to be traversed along a slot 83 in the base 1 by means of a traversing screw 40 which engages a collar or boss 41 slidable in the slot 83 and bearing against the bed-plate in such a manner that it admits of feed irrespective of the angular position of the bed-plate.

A further locking device may be provided (see Fig. 5) consisting of oppositely directed wedges 42 which are adapted to be moved into and out of engagement with the base plate 1 by bolts 43 having oppositely directed screw threads formed thereon, the said bolts mounted so as to be incapable of longitudinal movement and being rotatable through the medium of nuts 44 to move the wedges to operative or inoperative position as required. To facilitate accurate adjustment the bed-plate may be provided with a coned nose 45 having degrees of angularity marked thereon whilst the base plate 1 is marked with a zero line 46 for setting purposes.

The saw-frame 5 is mounted to reciprocate in a pivoted guide 47 the pivot 48 being carried at the end of an arm 49 whose other extremity is pivoted on a pin 50 carried in bosses 51 extending upwardly at either side of the spur wheel housing 14. The pivoted guide 47 carrying the sawframe can be given angular relationship to the arm 49 by means of a slipper attachment 52 to which the guide 47 is adjustably connected by bolts 84 and which carries a nut 53 slidable in a slot 54 in a guide member 55 mounted on the arm 49, the adjustment being effected by rotating a screw threaded spindle 56 on which the nut 53 is mounted, the said spindle being rotatable by a handle 57.

To balance the weight of the saw and its frame which tends to press the saw-blade upon the work a lever 58 is provided extending rearwardly of the machine and fixed by means of a flanged plate 59 to a boss 60 on the lever 49 the lower end of the said lever 58 being connected to a link 61 which in turn is connected to a long tension spring 62 extending from back to front of the machine and of reduced diameter at its forward end to engage with a nut 63 mounted on a screw threaded spindle 64, so that by turning the said spindle by a handle attached at its end 65 the tension of the spring 62 can be adjusted to suit requirements.

To regulate the depth of cut, a trigger arm 66 is pivotally connected to the pivoted arm 49, the pivot comprising a pin 67 slidable in a slot 68 formed in the arm 66, the trigger arm being pivoted at its other end at 69 to an arm 70 extending upwardly from the housing 14. Slidably mounted upon the arm 70 is a depth gauge element 71 having a screw threaded socket 72 through which passes a screw-threaded spindle 73 abutting at its lower end against a shoulder 74 projecting from the arm 70. The upper end of the spindle 73 is provided with a handle 75 for manual operation. The pivoted lever 49 is formed with a boss 76 for the purpose of engagement with the depth gauge 71 and is slotted at 77 to pass over and around the arm 70, a pin 78 extending into the slotted portion being adapted when the device is raised to inoperative position to engage a notch 79 in the arm 70. The lever 49 terminates in a hand grip device 80 and the trigger arm 66 terminates in a trigger 81 by means of which the trigger arm may be operated against the action of a spring 82 when it is desired to lower the lever 49 and arm 66 and cause the pin 78 to be released from the notch 79. The arm 70 is pivoted at its lower end to a bracket 85 extending from the housing 14.

In operation the work is fixed in the bed-plate 2 which is adjusted in position until the work is in a position in which the required cut can be made vertically. The saw 7 is then brought into position vertically above the part to be cut, the adjustment being effected by rotating the hand wheel 34 to traverse the housing 14, disc 11, connecting rod 9, saw frame 5, guide 47, slipper 52, arm 49 and their associated parts across the machine. The machine is set in operation by turning the handle 27 which rotates the cam 25 so that under the influence of spring 28 the arm 24, shaft 23 and forked arm 22 move towards the right Fig. 3, bringing the clutch members 19 and 20 into engagement so that the rotation imparted to the pulley 18 is transmitted through shaft 17, pinion 16, wheel 15 and shaft 12 to the disc 11, the rotary motion of the disc being utilized to reciprocate the saw frame 5 through the intermediary of connecting rod 9. To vary the length of stroke of the saw the pivot pin 10 may be mounted in a radial slot in the disc 11 and provided with means to clamp it in any desired position of adjustment.

At the commencement of operations the saw blade 7 will rest upon the surface of the work and the boss 76 and the arm 49 will be spaced above and away from the depth gauge element 71 which has been previously set to stop further descent of the saw and its frame when the desired depth of cut has been made.

When it is desired to raise the saw frame and retain it in its inoperative position the arm 49 is lifted about its pivot 50 by grasping the member 80 in such a manner that one finger can exert a pull on the trigger arm at 81, thereby compressing the spring 82 and allowing the arm 66 to extend as the arm 70 is rocked towards the left, Fig. 1, by the upward movement of the arm 49. This movement continues until the pin 78 is in a position to enter the notch 79 and hold the saw frame and its associated parts in a raised inoperative position.

When it is necessary to make a saw cut at an angle to the horizontal the saw frame and saw blade may be moved to an inclined position by adjusting the position of the nut 53 in the slot 54.

I claim:—

1. A machine tool for metal working purposes comprising a fixed support, an arm pivotally secured to said support, a guide pivotally secured to the free end of said arm, means for adjusting said guide about its pivotal connection to vary its angular relationship to said arm and for fixing said guide in adjusted position, a reciprocating tool holder mounted to slide in said guide, and means on said fixed support for reciprocating said tool holder, the angular relationship between the said arm and said guide being substantially retained throughout the operative movements of said tool holder.

2. A machine tool for metal working purposes comprising a fixed support, an arm pivotally secured to said support, a guide pivotally secured to the free end of said arm, means for adjusting said guide about its pivotal connection to vary its angular relationship to said arm and for fixing said guide in adjusted position, a reciprocating tool holder mounted to slide in said guide, and means on said fixed support for reciprocating said tool holder, and means for limiting the downward swinging movement of said arm, the angular relationship between the said arm and said guide being substantially retained throughout the operative movements of said tool holder.

3. A machine tool for metal working purposes according to claim 1, including means acting on said arm for counterbalancing the weight of said guide and tool holder.

In witness whereof I affix my signature.

ROBERT PRICE.